March 28, 1950  J. E. SHERLOCK  2,502,283
CONTROL THERMOSTAT FOR GAS HEATING DEVICES
Filed Jan. 5, 1946  3 Sheets-Sheet 1

Inventor
John Edward Sherlock
by
Attorneys

March 28, 1950  J. E. SHERLOCK  2,502,283
CONTROL THERMOSTAT FOR GAS HEATING DEVICES
Filed Jan. 5, 1946  3 Sheets-Sheet 2

Inventor
John Edward Sherlock
by
Attorneys

March 28, 1950 J. E. SHERLOCK 2,502,283
CONTROL THERMOSTAT FOR GAS HEATING DEVICES
Filed Jan. 5, 1946 3 Sheets-Sheet 3

Inventor
John Edward Sherlock
by
Attorneys

Patented Mar. 28, 1950

2,502,283

UNITED STATES PATENT OFFICE 2,502,283

CONTROL THERMOSTAT FOR GAS HEATING DEVICES

John Edward Sherlock, Sunbury-on-Thames, England, assignor to The British Thermostat Company Limited, Sunbury-on-Thames, England, a British company Application January 5, 1946, Serial No. 639,372
In Great Britain October 6, 1944

1 Claim. (Cl. 236—99)

This invention relates to control thermostats for use with gas heating devices, and has particular, although not exclusive, reference to heaters of the kind employed in refrigerators, the object of the invention being to provide a combined heater and thermostatic valve for controlling the same, which can be installed in the refrigerator or other apparatus as a complete self-contained unit.

According to the invention a thermostatically controlled gas heating device comprises a casing enclosing a thermally-responsive element, a control valve and range adjustment mechanism, the said casing also supporting a gas burner thereby enabling the device as a whole to be mounted as a unit in a refrigerator or other apparatus wherein the temperature of operation is to be controlled.

Reference will now be made to the accompanying drawings which show arrangements according to the invention and in which—

Figure 1:
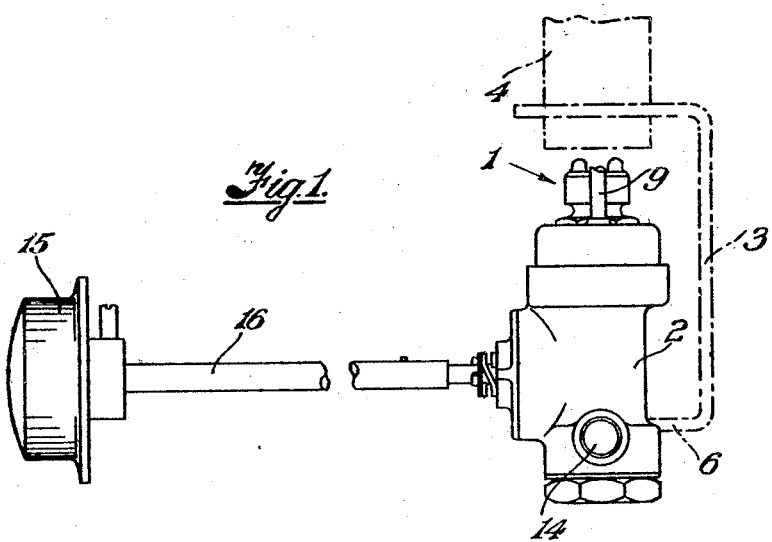
Figure 2:
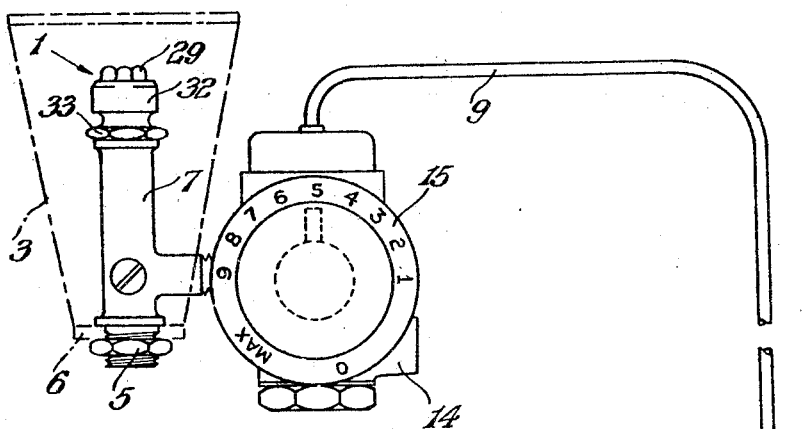
Figure 3:
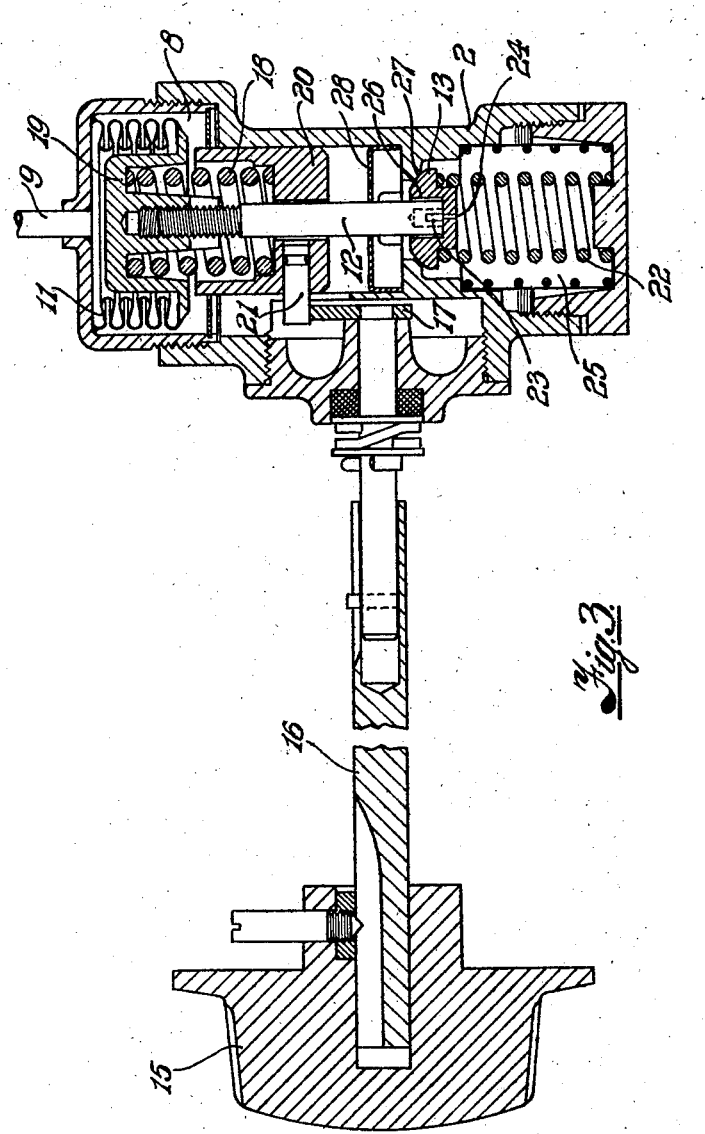
Figure 4:
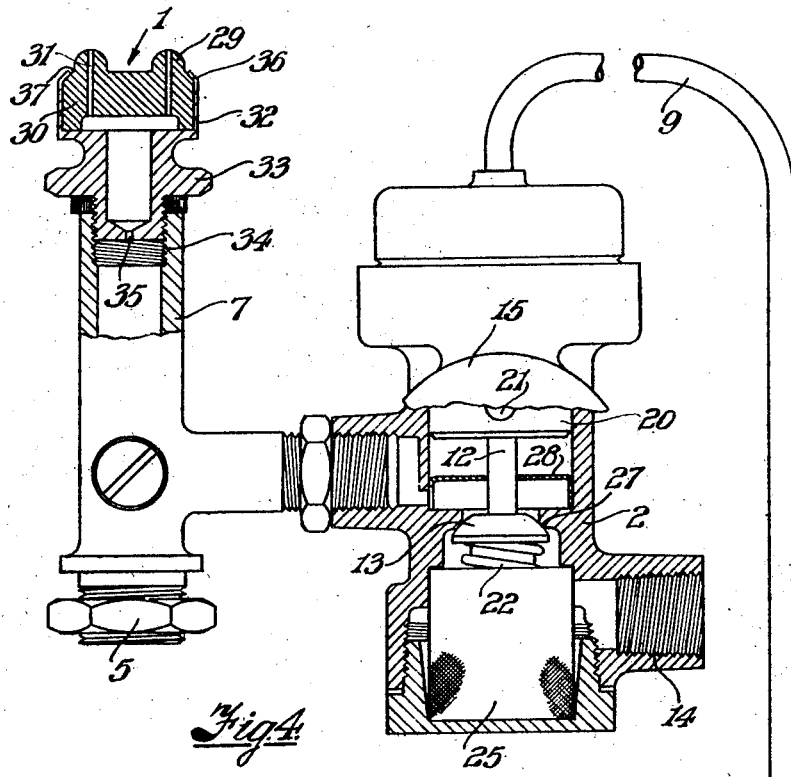
Figures 5, 6:
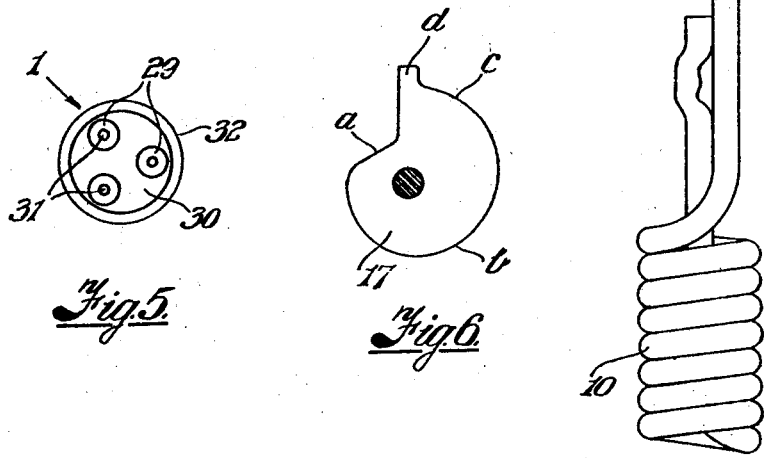

Fig. 1 is an elevation showing a gas heating device applicable to a refrigerator, Fig. 2 is another elevation taken at right angles to Fig. 1, Fig. 3 is a sectional elevation corresponding to Fig. 1 on an enlarged scale, Fig. 4 is a sectional elevation corresponding to Fig. 2 on an enlarged scale, Fig. 5 is a plan of the gas burner shown in Figs. 2 and 4, and, Fig. 6 is a detail view of the range cam.

Referring first to Figs. 1 and 2, the improved thermostatically controlled heating device comprises a gas burner 1 mounted directly on the casing or body 2 of a thermostatic control valve, both burner and casing being supported by a common element which, in the case of a refrigerator, may conveniently be an angle bracket 3 which is constructed to fit on to the boiler tube 4 of a refrigerator in which position it is adapted to be secured by means of clamping screws or similar fixing devices. A nut 5 secures the base portion 6 of the bracket to the lower end of the pipe 7 which supports the burner.

The thermal unit (see Figs. 3 and 4) consists of a bellows chamber 8 secured in the top of the casing 2 and connected by a capillary tube 9 to a coil 10 which is adapted to be inserted in a pocket or recess in the evaporator unit of the refrigerator. The expansible bellows 11 is connected by a valve stem 12 with a valve member 13 controlling the supply of gas from an inlet 14 to the gas burner 1. The working temperature can be adjusted by operation of a control knob 15 mounted at the front of the refrigerator casing and coupled to the thermostat by a long spindle 16 which at its inner end carries a range adjustment cam 17 adapted to vary the tension of a range spring 18, one end of which bears upon the movable inner end 19 of the bellows unit and the other end of which bears upon a slide 20 mounted concentrically around the stem 12. The cam 17 bears upon a stud 21 carried in the slide 20 whose vertical position in the casing is thereby adjustable. A second spring 22 is provided to act on the valve head 13 to apply a pre-load to supplement the initial load of the range spring 18.

The profile of the range cam 17 is shown in Fig. 6. When the portion $a$ of the cam is in contact with the stud 21, a permanently "on" position is provided but by rotational adjustment of the cam its surface portion $b$ which extends through approximately 180°, imparts a gradual increase to the compression of the spring 18 thereby varying the working temperature. When the portion $c$ of the periphery of the cam is in contact with the stud 21, the "off" position is reached wherein the slide 20 abuts against the bellows plate 19 and holds it stationary thereby keeping the valve member 13 in its closed position. A stop $d$ is provided to prevent complete rotation of the cam.

The range is initially adjusted by screwing the stem 12 in or out of the bellows plate 19 for which purpose the end of the stem is formed with a slot 23. To provide a by-pass when the valve is seated, the valve member 13 is formed with a central aperture 24 which maintains communication between the inlet chamber 25 and the burner by way of the slot 23 and annular space 26 surrounding the lower end of the valve stem. This by-pass ensures that a small amount of gas will be supplied to the burner 1 even when the valve member 13 is closed upon its seating, so as to provide a minimum flame to serve as a pilot light. A baffle 28 is fixed in the casing 2 above the valve seating 27 so as to prevent a temporary vacuum occurring in the feed pipe to the gas burner 1 when the "off" position is suddenly attained. A slot or aperture formed in the peripheral downwardly extending flange of the baffle member permits gas from the inlet chamber 25 to pass freely towards the burner 1. The baffle member 28 has a central aperture through which the valve stem 12 is slidable. It is to be understood that part of the chamber within which the slide 20 moves is permanently isolated from the gas feed pipe between the inlet chamber 25 and the burner 1, so that a sudden change of pressure in the space above the baffle resulting from a rapid upward movement of the slide 20 is not allowed to disturb the flow of gas through the aperture 24 of the valve member 13, as such a disturbance might result in the pilot flame being extinguished.

The gas burner 1 employed in the apparatus above described is preferably formed as shown in Figs. 2, 4 and 5 with three jets 29 arranged concentrically around a central axis, to give a more uniform distribution of the flame in the boiler tube than can be obtained with a single jet.

The gas burner comprises a ceramic body 30 generally cylindrical in form and from the upper surface of which the three equi-spaced jets 29 project. The ceramic body is formed with gas passages 31 which extend throughout its height, one of such passages being arranged centrally of each jet 29. The ceramic body 30 is mounted within a metal housing 32 from the base of which depends a portion 33 having a screw-thread 34 to enable it to be mounted in the gas pipe 7 having a standard gas thread. The base of this screw-threaded portion is closed save for a small central aperture 35 for restricting and regulating the gas flow. The component parts of the gas burner are held together by an inwardly directed shoulder 36 on the housing 32 which shoulder engages over a shoulder 37 formed on the ceramic body.

By raising the jets 29 above the upper surface of the ceramic body, as shown, air is admitted to the spaces between the jets thereby avoiding the production of a smoky flame and obviating the necessity for a central air inlet.

The invention possesses the advantage that it can be applied as a unit to existing refrigerators and other apparatus wherein a predetermined temperature is to be maintained and requires no structural alteration as the bracket can be clamped around the particular component which has to be heated.

Having now particularly described and ascertained the nature of my said invention, and in what manner the same is to be performed, I declare that what I claim is:

A thermostatic control for a gas heating device for use in a refrigerator, comprising a casing having a gas inlet and an outlet for supplying gas to a burner, an expansible and contractable thermally responsive element enclosed in the casing, a control valve between the inlet and outlet, an actuating rod between said thermally responsive element and said control valve, a manually operable range setting device, a slide movable by said setting device and adjustable thereby into a position to contract the thermally responsive element and prevent expansion thereof and to seat said control valve, said control valve having a head provided with an aperture for the flow of a small amount of gas to the burner to provide a minimum flame to serve as a pilot light, and means to prevent extinction of said pilot light by creation of a temporary vacuum in said outlet on sudden movement of said slide to contract said thermally responsive element, comprising a baffle mounted in said casing between said control valve and said thermally responsive element and outlet and having an aperture therein communicating with the aperture in said valve head to maintain flow of gas therefrom to the outlet to the burner when said thermally responsive element is suddenly contracted.

JOHN EDWARD SHERLOCK.

REFERENCES CITED

The following references are of record in the file of this patent:

UNITED STATES PATENTS

| Number | Name | Date |
|---|---|---|
| 1,570,446 | Mombaruzzo | Jan. 19, 1926 |
| 1,920,458 | Bast | Aug. 1, 1933 |
| 1,961,325 | Andersson | June 5, 1934 |
| 2,040,174 | Hainsworth | May 12, 1936 |
| 2,046,643 | Mackintosh | July 7, 1936 |
| 2,093,693 | Dillman | Sept. 21, 1937 |
| 2,123,921 | Andersson | July 19, 1938 |
| 2,140,947 | Andersson et al. | Dec. 20, 1938 |
| 2,151,040 | Malone | Mar. 21, 1939 |

FOREIGN PATENTS

| Number | Country | Date |
|---|---|---|
| 503,342 | Great Britain | Apr. 5, 1939 |